(12) United States Patent
Kashimba et al.

(10) Patent No.: US 8,897,265 B2
(45) Date of Patent: Nov. 25, 2014

(54) CALL HANDOFF BETWEEN DIFFERENT NETWORKS FOR HYBRID MOBILE DEVICE

(71) Applicant: Bandwidth.com, Inc., Raleigh, NC (US)

(72) Inventors: Jared Kashimba, Micanopy, FL (US); Sai Rathnam, Raleigh, NC (US)

(73) Assignee: Bandwidth.com, Inc., Raleigh, NC (US)

( * ) Notice: Subject to any disclaimer, the term of this patent is extended or adjusted under 35 U.S.C. 154(b) by 0 days.

(21) Appl. No.: 14/141,590

(22) Filed: Dec. 27, 2013

(65) Prior Publication Data

US 2014/0105179 A1    Apr. 17, 2014

Related U.S. Application Data

(63) Continuation of application No. 14/044,381, filed on Oct. 2, 2013.

(51) Int. Cl.
*H04W 4/00* (2009.01)
*H04W 36/00* (2009.01)
*H04W 36/14* (2009.01)

(52) U.S. Cl.
CPC .......... *H04W 36/0022* (2013.01); *H04W 36/14* (2013.01)
USPC .......................................... 370/331

(58) Field of Classification Search
CPC . H04W 36/0011; H04W 36/30; H04W 36/08; H04W 36/12; H04W 36/14; H04W 36/18; H04W 36/24; H04W 40/36; H04W 80/04
See application file for complete search history.

(56) References Cited

U.S. PATENT DOCUMENTS

| | | | | |
|---|---|---|---|---|
| 2006/0229101 | A1* | 10/2006 | LaBauve et al. | 455/560 |
| 2007/0015536 | A1 | 1/2007 | LaBauve | |
| 2007/0268858 | A1* | 11/2007 | Soto | 370/328 |
| 2009/0023450 | A1* | 1/2009 | George et al. | 455/442 |

* cited by examiner

*Primary Examiner* — Yong Zhou
(74) *Attorney, Agent, or Firm* — Gregory Stephens (57) ABSTRACT

Disclosed are techniques for hosting a communication session in a call server between communication devices. The call server functions as a bridge service between the communication devices joining an original communication link between the first communication device and the call server with a second communication link between the second communication device and the call server. The first communication device includes at least two RF transceivers each capable of communicating with the call server over a separate network using separate telephone numbers. The call server establishes an alternate communication link with the first communication device on an alternate network and joins it with the second communication link before disabling the original communication link to maintain the communication session between the communication devices.

15 Claims, 8 Drawing Sheets

CALL HANDOFF BETWEEN DIFFERENT NETWORKS FOR HYBRID MOBILE DEVICE

RELATED APPLICATIONS

This application claims priority to U.S. patent application Ser. No. 14/044,381 entitled "Call Handoff Between Different Networks", which was filed on Oct. 2, 2013 and is incorporated herein by reference in its entirety.

BACKGROUND

Mobile telephony devices utilizing wireless communication protocols are ubiquitous. Many of these devices utilize one of the competing cellular networks (e.g., GSM or CDMA) to place and receive telephone calls to other telephony endpoint devices. A telephony endpoint device may include another mobile telephony device on the same or another cellular network, a Voice-over-IP (VoIP) telephony device, and/or a plain old telephone service (POTS) telephony device. Each of these telephony endpoint devices may use a different access network but all are interfaced at some point to allow for communication among the different networks.

Recently, there has been introduced another type of mobile telephony device, one that is capable of utilizing multiple different networks depending on the current location or network conditions pertaining to the mobile telephony device. Such a mobile telephony device may be characterized as a hybrid mobile device due to its capability of making and receiving telephone calls on at least two distinct networks. Some hybrid mobile devices include the ability to start or establish a telephone call on one network (e.g., an IP based VoIP network over a WiFi connection) and handoff the call to a second network (e.g., a cellular network) when conditions on the original network degrade. Such a handoff may occur, for instance, when the mobile hybrid device moves out of range of the IP based WiFi access point. Rather than dropping the call, the hybrid mobile device, in conjunction with the a network based server, may switch to a cellular connection prior to severing the WiFi VoIP connection thereby ensuring that the hybrid mobile device stays connected to the other telephony endpoint and the call is not dropped.

Described herein are methods, systems, and techniques for implementing such an inter-network handoff for a hybrid mobile.

DETAILED DESCRIPTION

The embodiments described herein disclose systems and methods for intelligently structuring, handling, and enhancing communication sessions between or among communication devices. The systems and methods of the invention may be embodied in and performed by communication devices, call servers and other devices, and software instructions executed by some or all of such devices, as will be explained in detail below. The different types of networks contemplated herein include, for example, cellular mobile networks, the public switched telephone network (PSTN), and data networks, such as the Internet or other IP-based networks, including wide area networks, local area networks, and combinations thereof.

As used herein the term "communication session" is meant to generally indicate any one-way or two-way exchange of information between two or more communication devices. Communication sessions may include voice, data, video, and multimedia communication sessions, or any other type of data communication sessions or messaging exchanges. As used herein, the term "communication link" is intended to mean a physical or logical channel that connects two or more devices. A communication link may be a signaling link or a media link. In this context, a communication session may be established via one or more communication links. One or more media streams may be transmitted over a communication link. A call server may be situated between communication devices thereby making the call server an endpoint in a communication link. The call server may be hosted within an IP network such as, for instance, the Internet or a LAN/WAN accessible to the Internet.

The convergence of and inter-operation among different types of network technologies (e.g., heterogeneous network inter-operability) blurs the line between various distinct networks. This disclosure discusses access networks that may be characterized as the portion of a communication network that connects subscriber communication devices to a service provider's core network. An access network may also be referred to as the interface between the communication device and the network. Another type of interface may be the interface between networks. That is, the interface necessary to facilitate seamless communication from one network to another.

Therefore, references herein to a communication device capable of connecting to or communicating via a mobile carrier network refer to a communication device equipped with a cellular transceiver for wireless communication with basestations and other mobile carrier network access points. Similarly, references herein to a communication device capable of connecting to or communicating via a data network refer to a communication device equipped with a transceiver or other network interface for wireless communication (e.g., 802.11) with a router or other data network access point. One particular communication device may be characterized herein as a wireless handset. A wireless handset may include multiple RF transceivers, one of which may be operable to connect to an access network for a mobile carrier network (e.g., cellular network) and another of which may be operable to connect to an access network for an IP data network (e.g., 802.11).

Figure 1:
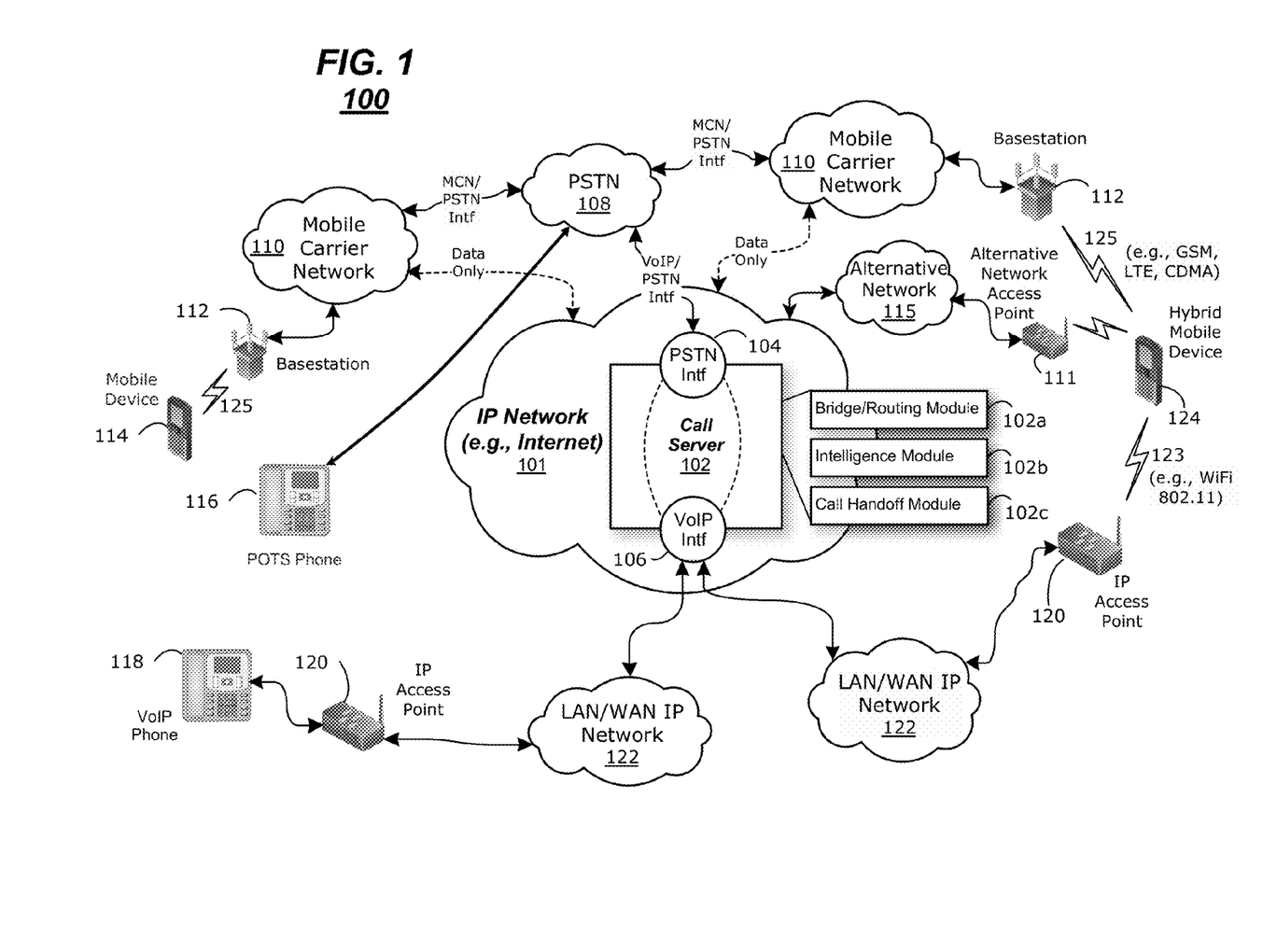
FIG. 1 illustrates an exemplary networked environment for implementing certain exemplary embodiments described herein.

FIG. 1 illustrates an exemplary networked environment 100 for implementing certain exemplary embodiments described herein. The networked environment 100 may include multiple distinct inter-connected networks such as, for instance, a large scale internet protocol (IP) network (e.g., the Internet) 101, one or more IP based local area networks or wide area networks (LAN/WAN) 122, mobile carrier networks 110, and the PSTN 108. While these distinct networks utilize different protocols and signaling schemes, there are various interfaces that allow for the seamless transition of voice and data (including text, audio, and video) such that various communication endpoints may communicate with one another over one or more of these inter-connected networks.

The PSTN 108 can be characterized as a circuit switched point-to-point communication network in which a physical connection between the endpoints is maintained for the duration of the connection. The PSTN 108 may also be referred to as the legacy telephone network as it is the backbone infrastructure for connecting endpoints comprised of Plain Old Telephone Service (POTS) phones 116.

Mobile carrier networks 110 (sometimes referred to as cellular networks) may come in different varieties based on the radio transmission scheme 125 between a communication device known as a wireless handset (e.g., mobile or cellular phone) 114 and the mobile carrier network basestation 112 that is in communication with the wireless handset 114. Two such radio transmission schemes are the Global System for Mobile Communication (GSM) and Code Division Multiple Access (CDMA). These radio transmission schemes are incompatible with one another necessitating an intervening interface to allow communication between endpoints on either network. In addition, each network may operate over a specific frequency ranges. Often, there may even be an intervening network such as the PSTN 108 between two distinct mobile carrier networks 110. Each mobile carrier network 110 includes an interface to the PSTN 108 such that calls crossing that interface can be handled by the receiving network whether it is a mobile carrier network 110 or the PSTN 108.

Various mobile carrier network operators base their network on one of the radio transmission schemes 125 and provide service to wireless handsets 114 using that radio transmission scheme 125 over a defined frequency band. For example, a wireless handset 114 wirelessly communicates with a basestation 112 that serves as an access network to the mobile carrier network 110. The basestation 112 authenticates and authorizes the wireless handset 114 to the mobile carrier network 110 and, in conjunction with other equipment within the mobile carrier network 110, manages calls to and from the wireless handset 114. The mobile carrier network 110 provides connectivity for any wireless handsets 114 capable of cellular transmission that are physically located within range of the mobile carrier network 110. The range of a mobile carrier network 110 depends in part on an amplification, power, and/or energy associated with the antennas comprising cellular base station, wireless handsets 114 and the like. As the wireless handset 114 moves toward the outer range of the mobile carrier network 110, the strength of the cellular signals degrade.

Similarly, an IP based data network 122 like the Internet 101 may provide wireless connectivity to wireless handsets 114 within range of an IP access point 120. For instance, an IP access point 120 may provide wireless connectivity using any of the 802.11 WiFi standards and/or any other type of IP based connectivity standard. As will be appreciated by those of skill in the art, a wireless handset 114 may experience a stronger connection signal when located closer to an IP access point 120 than when located further away from the IP access point 120. Thus, the strength of the wireless data connection may fade as the wireless handset 114 moves away from an IP access point 120.

There may also be one or more alternative networks 115 that may provide access to the Internet 101 for a hybrid mobile device 124 or other wireless handset devices 114. One such alternative network 115 may be characterized as a WiMax network operable over the 802.16 wireless protocol standard. Another such alternative network 115 may be characterized as a whitespace network. A whitespace network may utilize RF spectrum that is shared with television broadcasters. The television broadcasters do not necessarily need to utilize all the spectrum allocated to them to broadcast their video signals. The unused spectrum may be tapped into to provide an alternative RF access point to an alternative network 115 that can interface with the Internet 101.

The collection of IP based data networks illustrated in FIG. 1 such as LAN/WANs 122, and the Internet 101 all run on a packet based data transfer protocol characterized as packet switching. Packet switching essentially chops up a data stream (e.g., text, voice, data) into segments and transfers them across an IP network to a destination where the packets are re-assembled into the original data stream for output. Voice over IP (VoIP) is a specialized subset of IP packet based communication directed to IP telephony. End user devices 118 utilize an IP access point 120 to the larger IP network. The IP access point 120 may be wired, wireless (e.g., WiFi), or a combination wired/wireless access point such as those illustrated in FIG. 1. A VoIP communication device 118 may communicate with an IP access point 120 to gain access to the larger IP network 101 and other communication devices. The VoIP communication device 118 has been illustrated as a wireline type device but may just as easily be a wireless device communicable with the IP access point 120 over, for instance, one or more of the 802.11 protocols.

In certain embodiments, mobile carrier network(s) 110 include cellular networks or portions of cellular networks based on GSM, LTE, CDMA, and/or any other cellular network standards. IP based data networks 122, 101 include, for example, the Internet, one or more intranets, wide area networks (WANs), local area networks (LANs), and the like, portions or all of which may be wireless and/or wired. For instance, an IP based data network 122, 101 may be a wireless network or a portion of a wireless network implemented using an IEEE 802.11 standard, WiMAX, and/or any other wireless data communication standard. As is known in the art, the resources the various networks 108 (PSTN), 110 (Mobile Carrier), 122, 101 (IP Based) may interface with the call server 102 through gateway devices, routers and/or other appropriate devices (not shown). Similarly, the wireless handsets 114 may interface with the various networks 108 (PSTN), 110 (Mobile Carrier), 122, 101 (IP based) and alternative networks 115 through appropriate access points 111, 120 (some not shown).

As one may surmise, it is far less complicated when both communication devices in a communication system utilize the exact same network. For instance, POTS phone to POTS phone would communicate over the PSTN only while a GSM wireless handset to another GSM wireless handset of the same mobile service provider may be handled within the mobile carrier network. Lastly, a VoIP phone calling another VoIP phone would stay exclusively on a packet based series of networks like LAN/WANs, 122 and/or the Internet 101.

Things get more complicated when the communication devices are associated with different networks. For instance, a POTS phone placing a call to a wireless handset or a VoIP phone calling a POTS phone. In these scenarios, and others, there is an interface between the networks that serves to resolve any differences so that a communication session may be connected and maintained. As described above there may be an intervening network between two endpoint networks. For instance, each mobile carrier network 110 includes an interface to the PSTN 108 such that calls crossing that interface can be handled by the receiving network whether it is a mobile carrier network 110 or the PSTN 108. Similarly, each VoIP service provider on an IP packet based network 122, 101 includes an interface to the PSTN 108 such that calls crossing that interface can be handled by the receiving network whether it is an IP packet based network 122, 101 or the PSTN 108. Thus, the PSTN 108 serves as a common routing network for endpoint communication devices that are associated with other networks. It is possible to create a VoIP interface such that IP packet based networks 122, 101 can interface directly with mobile carrier networks 110.

There is one aspect that each network (e.g, PSTN 108, VoIP 101, 122 and mobile carrier 110) has in common that facilitates communication sessions among communication devices native to the various networks. The commonality is that each communication device has a unique telephone number (TN) as an identifier. The format of the telephone number is identical regardless of the network in use. In North America, for instance, the TN is a ten-digit number. Each communication device in North America is associated with a 10 digit telephone number that subscribers 'dial' to reach other subscribers no matter the network the other subscriber uses. Thus, users of communication devices need not worry about how to reach another user because all communication devices key off an associated telephone number. From the user's perspective, it is up to the networks to resolve any connection issues and allow calls to be connected so that a communication session may occur. For the most part, these network differences have been resolved on an industry wide scale and it is relatively routine to place and connect calls between endpoints regardless of their native networks.

Each network service provider may provide equipment (communication devices) and service plans to its subscribers. These service plans can vary greatly in cost depending on the expected use of network resources. In addition, some service plans may bundle data and voice services in the cost of the service plan. This is often the case for mobile carrier network 110 subscribers since the ability to access data networks such as the Internet on a mobile device is a desired service. This is especially the case when a WiFi data connection is out of range. As a result, bundled voice and data services can place a significant burden on the mobile carrier network resources that can lead to use restrictions for bundled voice/data plans.

One approach that addresses the mobile network congestion problem is a communication device that may be characterized as a hybrid mobile device 124. The hybrid mobile device 124 may be associated with network infrastructure that defaults telephony services to a WiFi connection 123 using, for instance, VoIP over an 802.11 protocol via an IP access point 120. The hybrid mobile device 124 may default to WiFi mode when available and may only switch to a mobile carrier network 110 connection via a radio transmission scheme 125 to a basestation 112 (cellular mode) when the WiFi connection 123 is lost or unavailable. As it pertains to data, this heterogeneous network switching may be referred to as WiFi offloading. For telephony services, however, such a soft handover between heterogeneous networks is a more daunting and complex process.

One implementation of a soft handover of a voice call between heterogeneous networks involves associating two telephone numbers to a hybrid mobile device 124. A first telephone number may be characterized as a 'data' telephone number that is based on a VoIP telephony scheme. The second number may be characterized as a 'mobile' telephone number that is used in conjunction with a radio transmission scheme 125 associated with a mobile carrier network 110. The subscriber may only be aware of the data number and not have actual knowledge of the mobile number. For all intents and purposes, the subscriber places and receives calls using the data telephone number. To reach the subscriber, a second communication device would dial the subscriber's data telephone number.

When the hybrid mobile device 124 is connected with an IP access point 120, telephony services and functions are handled using VoIP. To dial out, the subscriber dials the telephone number of the intended recipient's communication device. The intelligence within the hybrid mobile device 124 recognizes that the subscriber is attempting to place a call and notes the telephone number entered. In actuality, the hybrid mobile device 124 connects with a call server 102 hosted in an IP based network 101 such as the Internet. The call server 102 may have a pool of telephone numbers reserved for establishing connections with the hybrid mobile device 124. The hybrid mobile device 124 while appearing to dial the intended telephone number actually dials one of the pool numbers associated with the call server 102 and establishes a first communication link. The call server 102 then determines the intended telephone number that was dialed by the subscriber and places a call to the communication device associated with that telephone number (called communication device). Upon connecting the second communication link between the call server and the called communication device, the call server 102 joins the first communication link with the second communication link to create a full-duplex communication session between the hybrid mobile device 124 and the called communication device.

The communication session will stay active until one of the respective communication devices terminates the call. Sometimes, however, the hybrid mobile device 124 may experience a loss of service with or degradation to the WiFi connection. This commonly occurs if the hybrid mobile device 124 moves out of range of the IP access point 120. In such a scenario, it is necessary to hand the call over to the mobile carrier network 110 to avoid terminating the communication session. This may be accomplished by creating a third communication link between the call server 102 and the hybrid mobile device 124. The third communication link, however, may be routed through the mobile carrier network 110 to the hybrid mobile device 124. When the first communication link is lost or is significantly degraded, it may be seamlessly replaced by the third communication link such that the call server 102 bridges or connects the third communication link with the second communication link to maintain the communication session.

On inbound calls to the hybrid mobile device 124, a calling communication device dials the data number of the hybrid mobile device 124. This initiates a connection to the call server 102 as the data number is automatically routed to the call server 102. The call server then establishes a first communication link with the calling communication device. The call server 102 then establishes a second communication link with the hybrid mobile device 124. The call server defaults to WiFi mode in attempting to establish the communication link with the hybrid mobile device 124. If the hybrid mobile device 124 is not currently connected to an IP access point 120 and is therefore inaccessible via VoIP over WiFi, the call server will switch to cellular mode. In cellular mode, the call server will establish the second communication link over the mobile carrier network 110. This cannot be done, however, using the hybrid mobile device's 124 data number since that number is unknown to the mobile carrier network 110. To establish the second communication link between the call server 102 and the hybrid mobile device 124, the call server accesses a translation table within a database that includes data/mobile number pairs in which each pair may be associated with a hybrid mobile device 124. In this case, the call server will lookup the data number and have a mobile number returned. The call server 102 may then establish the second communication link by dialing the mobile number and establishing a connection to the hybrid mobile device 124. The call server may then join the first and second communication links to create the full-duplex communication session between the calling device and the hybrid mobile device 124.

The communication session will stay active until one of the respective communication devices terminates the call. While the communication session is in progress, the hybrid mobile device 124 may re-establish a WiFi connection. In such a scenario, it may be desirable to hand the call over to the VoIP network to reduce the burden on the mobile carrier network 110. This may be accomplished by creating a third communication link between the call server 102 and the hybrid mobile device 124. This time the third communication link may be routed over the VoIP network 101, 122 via an IP access point 120 to the hybrid mobile device 124. When the third communication link is sufficiently established, it may seamlessly replace the first communication link such that the call server 102 bridges or connects the third communication link with the second communication link to maintain the communication session.

In another outbound calling scenario, the hybrid mobile device 124 may not have an initial connection via WiFi to a packet based VoIP network 122, 101 or the WiFi connection may not be sufficiently good. An outbound call to a destination telephone number is established over the mobile carrier network 110 using the mobile number associated with the hybrid mobile device 124. For caller ID purposes, however, the calling number is the data number associated with the hybrid mobile device 124. The call is again routed to and through the call server 102. The first communication link is between the hybrid mobile device 124 and the call server. This is accomplished by having the hybrid mobile device 124 automatically place a call to the call server 102 using one of the pool of telephone numbers associated with the call server. Just prior to the call, the hybrid mobile device 124 may utilize the mobile carrier network's data services to send a message to the call server 102. The message to the call server 102 may contain the mobile and data numbers of the hybrid mobile device 124 and the destination telephone number such that when the call server 102 receives the call from the hybrid mobile device 124 using the mobile number, it can place a call to the destination telephone number and substitute the data telephone number in the caller ID field. Upon establishing the second communication link, the call server 102 may then join the first and second communication links to create the full-duplex communication session between the hybrid mobile device 124 and the destination device.

Figure 2:
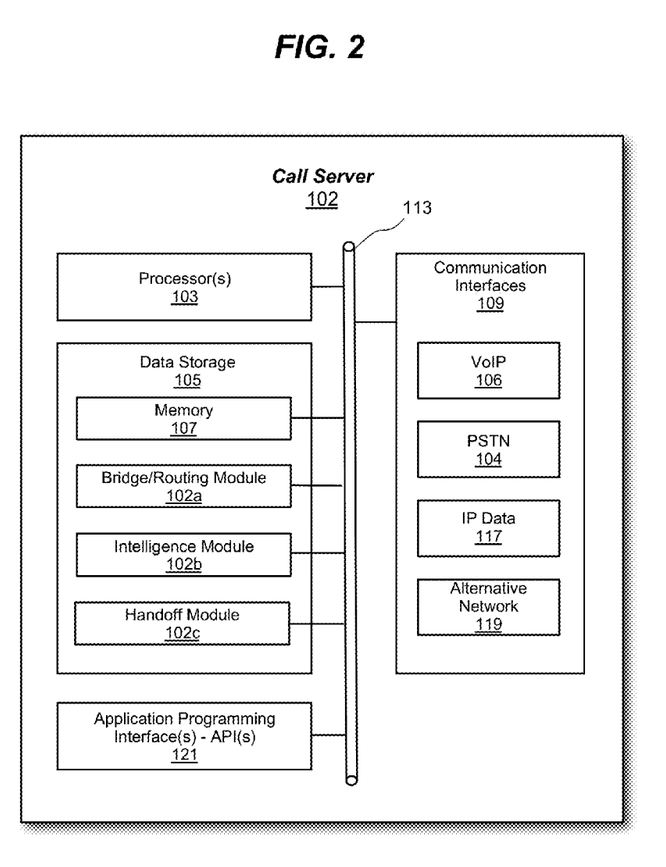
FIG. 2 is a block diagram illustrating some of the functions of the call server according to one or more embodiments described herein.

FIG. 2 is a block diagram illustrating some of the functions of the call server according to one or more embodiments described herein. The call server 102 may comprise, for example, a server computer or any other system having computing capability. The schematic block diagram shows that the call server 102 may include at least one processor 103, at least one communication interface 109 (e.g., a network interface card or the like), and a data storage component 105, each of which is coupled to a local interface 113. The local interface 113 may comprise, for example, a data bus with an accompanying address/control bus or other bus structure as can be appreciated. Stored in the data storage component 105 are a memory 107 and multiple components 102a-102c (e.g., software applications) that are executable by the processor 103 and that provide at least some of the functionality of the call server 102.

Alternatively, a plurality of call servers 102 may be employed and may be arranged, for example, in one or more server banks or computer banks or other arrangements. For example, a plurality of call servers 102 together may comprise a cloud computing resource, a grid computing resource, and/or any other aggregated or distributed computing arrangement. Such call servers 102 may be located in a single installation or may be distributed among different geographical locations. For purposes of convenience, the call server 102 is illustrated in FIGS. 1 and 2 and referred to herein in the singular. Even though the call server 102 is referred to in the singular, it is understood that a plurality of call servers 102 may be employed in various arrangements as described above.

The communication interface(s) 109 may include a voice-over-IP (VoIP) interface 106 adapted to exchange IP based telephony signaling and/or media data with other IP network devices using a VoIP protocol. Another communication interface 109 may be a PSTN interface 104 adapted to convert incoming PSTN audio data to VoIP audio data and convert outgoing VoIP audio data to PSTN audio data. Still another communication interface 109 may be an IP data interface 117 adapted to exchange IP data with other IP network devices. This may include IP data exchanged with a mobile wireless handset 114, 124 over an intermediate mobile carrier network 110. Yet another communication network interface 109 may be directed toward an alternative network 115 adapted to exchange data with a wireless handset 114 or a hybrid mobile device 124. Examples of alternative network(s) 115 may include, but are not limited to, WiMax and whitespace. A whitespace network may be characterized as one that utilizes frequency spectrum that is overlapping with that of broadcast television frequency spectrum.

The call server 102 may further include several inter-operable software modules operable with application programming interfaces (APIs) 121 and communication interfaces 109 and configured to intelligently manage the communication session. These software modules may include a bridge/routing module 102a, an intelligence module 102b, and a handoff module 102c. The aforementioned software modules have functional names for convenience and ease of reference. These functional names should not be construed as limiting to the various software modules individually or the call server 102 as a whole. There may be functions performed by one or more of the software modules in conjunction with the APIs 121 and network communication interfaces 109 that achieve a stated purpose or goal.

The bridge/routing module 102a may be configured to physically or logically connect communication links. The intelligence module 102b may be configured to monitor network conditions and receive communication session data from the hybrid mobile device 124 regarding its connection with the IP access point 120 so as to intelligently determine the need for a soft handoff to the mobile carrier network 110. Communication session data may refer to any data relating to a communication session or its constituent communication link(s), such as, but not limited to, detected signal strengths, available networks, protocol and buffer statistics and analysis, environmental and/or geographical factors, the performance of access points and other network components, past interactions between or among communication devices, access points and other network components, context of conversations during voice calls, and other data points described herein. The call handoff module 102c may be configured to initiate a handoff from one communication link to another communication link with the assistance of the bridge/routing module 102a and the intelligence module 102b.

More specifically, the bridge/routing module 102a may cooperate with the APIs and network interfaces to physically or logically connect communication links to initially establish a communication session between communication devices and/or to perform a handoff of at least one communication link of a communication session from one network to another network. A communication session may be, for instance, between a hybrid mobile device 124 and a second telephony endpoint (e.g., 114, 116, 118). The handoff may be caused by an instruction or command received from the call handoff module 102c. The bridge/routing module 102a may be configured to physically or logically establish communication links, join communication links, and sever communication links to a common or shared communication session based on commands or instructions received from the call server 102.

The intelligence module 102b may cooperate with the APIs and network interfaces to monitor and gather (receive) data pertaining to network conditions and communication device connections with various networks. The data may then be intelligently processed to predict or determine the need for a handoff of at least one communication link of a communication session. The data received by the intelligence module 102b may include out of band and/or out of network signaling from a communication device to indicate that a handoff is needed. In such a case, the intelligence module 102b may instruct the call server 102 to establish a new communication link via the bridge/routing module 102a and then instruct the call handoff module 102c to initiate a handoff process once the new communication link has been established.

The call handoff module 102c may cooperate with the APIs and network interfaces to effect a handoff of a first communication link between the call server 102 and the hybrid mobile device 124 to a second communication link between the call server 102 and the hybrid mobile device 124. The call handoff module 102c may receive data and instructions from the intelligence module 102b that indicates a handoff may be needed imminently based on the degrading network conditions associated with the first communication link. The call handoff module 102c may then execute certain instructions to establish a second communication link between the call server 102 and the hybrid mobile device 124. Once the second communication link has been established, the call handoff module 102c may instruct the bridge/routing module 102a to join the second communication link to the communication session with the other telephony device (114, 116, 118) prior to severing the first communication link between the call server 102 and the hybrid mobile device 124.

The call server 102 may execute various applications and/or other functionality for, among other things, setting-up, managing and tearing-down communication sessions between communication devices 124 and 114, 116, 118. Also, various data may be stored in a data storage 105 via memory 107 of the call server 102. Data storage 105 illustrated in FIG. 2 may be representative of a plurality of data stores, as can be appreciated. The data stored in the data storage 105, for example, may be associated with the operation of the various applications and/or functional entities of the call server 102.

Figure 3:
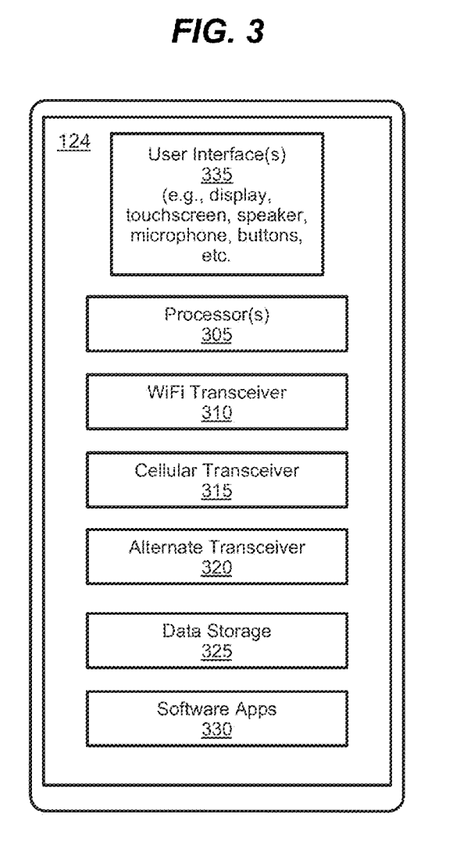
FIG. 3 is a block diagram illustrating a hybrid mobile device according to one or more embodiments described herein.

FIG. 3 is a block diagram illustrating a hybrid mobile device 124 according to one or more embodiments described herein. The hybrid mobile device 124 may include a processor or processors 305 for controlling the various components and functions of the hybrid mobile device 124. The hybrid mobile device 124 may also include multiple RF transceivers such as, for instance, a WiFi transceiver 310, a cellular transceiver 315, and an alternate transceiver 320.

The WiFi transceiver 310 may be operable to communicate with an IP network access point 120 using one or more of the 802.11 wireless transmission protocols. Upon connection with an IP network access point 120, the hybrid mobile device 124 may exchange IP data with servers or other computers that are connected with or communicable with the Internet 101 via LAN/WAN 122. This may include the call server 102 shown in FIG. 1.

The cellular transceiver 315 may be operable to communicate with a mobile carrier network 110 for both voice and IP data communication. On the voice side, the mobile carrier network 110 may be based on GSM, CDMA, or other communication protocols while on the IP data side, the mobile carrier network 110 may be based on, for example, GPRS, EDGE, EV-DO, HSPA-D, HSPA-U, LTE, UMTS-WCDMA, UMTS-TDD, etc.

In one embodiment, the alternate transceiver 320 may be a WiMax transceiver that is operable to communicate with an IP network access point using one or more of the 802.16 wireless transmission protocols. Upon connection with a WiMax network access point, the hybrid mobile device 124 may exchange IP data with servers or other computers that are connected with or communicable with the Internet 101 via WiMax network 115. This may include call server 102 shown in FIG. 1. In another embodiment, the alternate transceiver 320 may be a whitespace transceiver that is operable to communicate with a whitespace network access point. The whitespace network, in turn, may be communicable with the Internet 101 to allow IP data communication between the hybrid mobile device 124 and servers or other computers that are connected with or communicable with the Internet 115. This may include call server 102 shown in FIG. 1.

The hybrid mobile device 124 may further include data storage 325, software applications 330, and various user interface(s) 335. The data storage 325 may include, for example, one or more types of memory devices including, but not limited to, flash memory usable for ROM, RAM, PROM, EEPROM, and cache. The software applications 330 may include, for example, one or more software applications executable on or by the processor(s) 305 including, but not limited to, web browsers, email applications, application specific data and/or audio/video applications, call handoff applications, etc. The user interface(s) 335 may include, for example, a display, a touchscreen for soft-key input, speaker(s), microphone(s), a keyboard for hard-key input, and one or more buttons.

Figure 4:
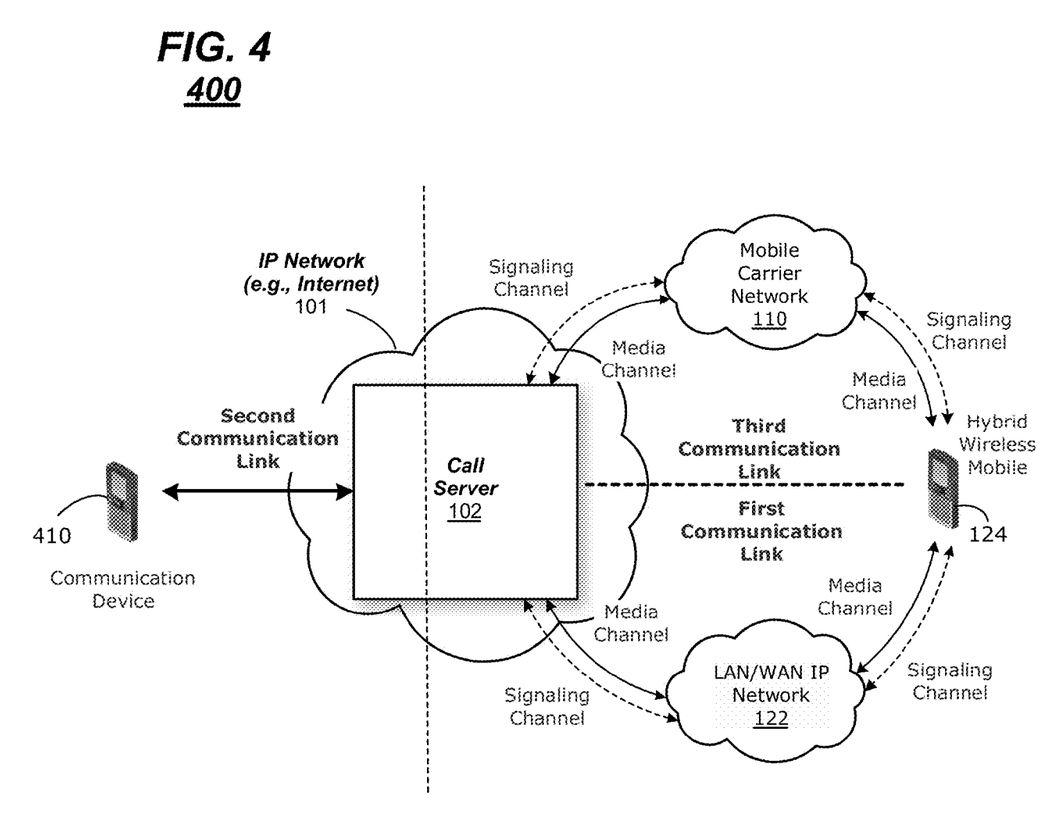
FIG. 4 is a block diagram illustrating establishing a communication session between communication devices according to one or more embodiments described herein.

FIG. 4 is a block diagram illustrating establishing a communication session between communication devices 124, 410 according to one or more embodiments described herein. In this implementation, the hybrid mobile device 124 may have two telephone numbers associated therewith. A first telephone number may be characterized as a 'data' telephone number that is based on a VoIP telephony scheme implemented on an IP network such as, for instance, LAN/WAN IP network 122 communicable with Internet 101. The second number may be characterized as a 'mobile' telephone number that is used in conjunction with a radio transmission scheme 125 associated with a mobile carrier network 110. The user may only be aware of the data number and not have actual knowledge of the mobile number. For all intents and purposes, the user places and receives calls using the data telephone number or signaling messages that include the data telephone number or a reference to the data telephone number. To reach the user, a second communication device would dial the user's data telephone number.

When the hybrid mobile device 124 is connected with an IP access point 120 to IP network 122, telephony services and functions are handled using VoIP protocols and messaging. To place a call, the user dials the telephone number of the intended recipient's communication device 410 using a dialer application that may be one of the software applications 330. The intelligence within the hybrid mobile device 124 recognizes that the user is attempting to place a call and notes the telephone number entered. In actuality, the hybrid mobile device 124 connects, via VoIP signaling (e.g., Session Initiation Protocol or SIP), with the call server 102 hosted in an IP based network 101 such as the Internet. The call server 102 may have a pool of telephone numbers reserved for establishing connections with the hybrid mobile device 124. The hybrid mobile device 124 while appearing to dial the intended telephone number may actually dial one of the pool numbers associated with the call server 102 and establishes a first communication link with the call server 102. This may occur over a signaling channel associated with the network that is established between the hybrid mobile device 124 and the call server 102. The call server 102 may then determine the intended telephone number that was dialed by the subscriber and places a call (e.g., call signaling) to the communication device associated with that telephone number (called communication device). Upon connecting the second communication link between the call server 102 and the called communication device 410, the call server 102 joins the first communication link with the second communication link to create a full-duplex communication session (e.g., media channel connection) between the hybrid mobile device 124 and the called communication device 410. In some embodiments, the media channel connection may utilize a media bypass that does not necessarily involve the call server 102 for exchanging non-signaling media data between the hybrid mobile device 124 and the called communication device 410.

When the hybrid mobile device 124 is not connected with an IP access point 120, telephony services and functions are defaulted over to the mobile carrier network 110. To place a call, the user dials the telephone number of the intended recipient's communication device 410. The intelligence within the hybrid mobile device 124 recognizes that the user is attempting to place a call and notes the telephone number entered. In actuality, the hybrid mobile device 124 connects with the call server 102 hosted in an IP based network 101 such as the Internet by way of the mobile carrier network 110. The call server 102 may have a pool of telephone numbers reserved for establishing connections with the hybrid mobile device 124. The hybrid mobile device 124 while appearing to dial the intended telephone number actually dials one of the pool numbers associated with the call server 102. The mobile carrier network 110 then routes the call to the call server 102. The call server 102 establishes a first communication link with the hybrid mobile device 124 that spans the IP network 101 and the mobile carrier network 110. An intermediate network such as the PSTN 108 may be used to interface between the IP network 101 and the mobile carrier network 110. This may occur over a signaling channel associated with the network that is established between the hybrid mobile device 124 and the call server 102. The call server 102 then determines the intended telephone number that was dialed by the subscriber and places a call to the communication device 410 associated with that telephone number (called communication device). In addition, the call server substitutes the user's data telephone number into the caller ID field for the mobile number. Upon connecting the second communication link between the call server 102 and the called communication device 410, the call server 102 joins the first communication link with the second communication link to create a full-duplex communication session (e.g., media channel connection) between the hybrid mobile device 124 and the called communication device 410.

To receive a call into the hybrid mobile device 124, the other communication device 410 dials the hybrid mobile device's data telephone number. The call server 102 will receive the call as the data telephone number dialed by communication device 410 is associated with the call server 102. Call server 102 establishes a first communication link with the communication device 410 and then determines the status of the hybrid mobile device 124 associated with the data telephone number.

If the hybrid mobile device 124 is currently connected to an IP access point 120 (e.g., a WiFi connection), the call server 102 will establish a second communication link with the hybrid mobile device 124 over the IP network 101/122. Upon connecting the second communication link between the call server 102 and the hybrid mobile device 124, the call server 102 joins the first communication link with the second communication link to create a full-duplex communication session (e.g., media channel connection) between the hybrid mobile device 124 and the called communication device 410.

If the hybrid mobile device 124 is not currently connected to an IP access point 120 (e.g., a WiFi connection), the call server 102 will establish a second communication link with the hybrid mobile device 124 over the mobile carrier network 110. This may be done by looking up the data telephone number in a database and retrieving an associated mobile number for the hybrid mobile device 124. The call server then calls the mobile number to establish the second communication link. Upon connecting the second communication link between the call server 102 and the hybrid mobile device 124, the call server 102 joins the first communication link with the second communication link to create a full-duplex communication session (e.g., media channel connection) between the hybrid mobile device 124 and the called communication device 410.

In all of the aforementioned call establishment scenarios, the called communication device 410 may be a mobile device 114, a POTS phone 116, or a VoIP phone 118. The communication link between the call server 102 and the called communication device 410 may be routed over the appropriate network depending on the type of communication device 410.

Figure 5:
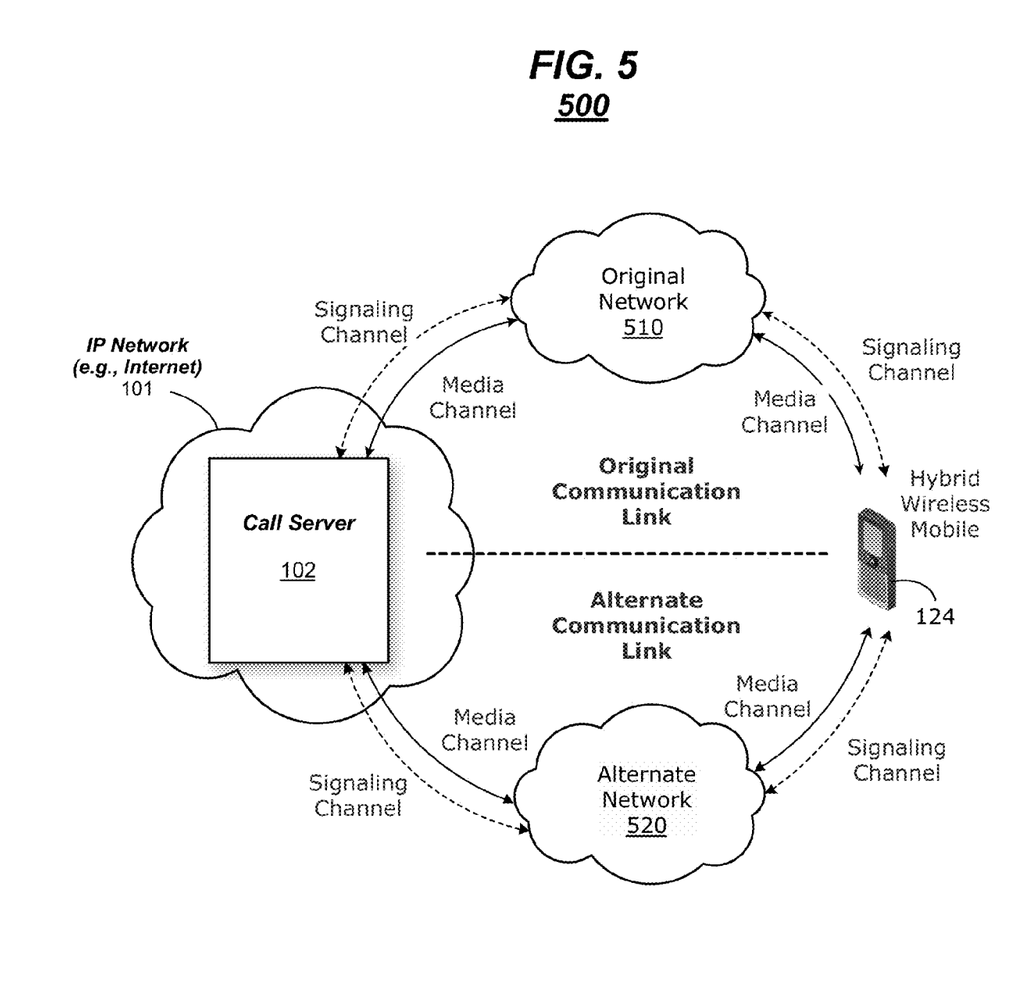
FIG. 5 is a block diagram illustrating a communication session handoff between a hybrid mobile device and a call server utilizing different networks according to one or more embodiments described herein.

FIG. 5 is a block diagram illustrating a communication session handoff between a hybrid mobile device 124 and a call server 102 utilizing different networks 510, 520 according to one or more embodiments described herein. Once a call has been established between a hybrid mobile device 124 and another communication device 410 with the call server 102 acting as a bridge connecting the two communication devices as described above, the communication session will stay active until one of the respective communication devices terminates the call.

Sometimes, however, the hybrid mobile device 124 may experience a loss of service with or degradation to the original network 510 connection used to establish the call. The original network 510 may be a mobile carrier network 110 or an IP network 122/101. In such a scenario, it is necessary to hand the call over (e.g., handoff) to an alternate network 520 to avoid terminating the communication session. The alternate network 520 may be the opposite of the original network 510. For example, if the original network 510 was an IP network 122/101, the alternate network 520 may be a mobile carrier network 110 and vice versa. The embodiments are not limited to these examples. There may be other alternate network(s) 520 that are neither mobile carrier network(s) 110 or IP network(s) 122/101.

The handoff may be accomplished by creating an alternate communication link between the call server 102 and the hybrid mobile device 124. The alternate communication link, however, will be routed through the alternate network 520 to the hybrid mobile device 124. When the original communication link is lost or is significantly degraded, it may be seamlessly replaced by the alternate communication link such that the call server 102 bridges or connects the alternate communication link with the communication link to the other communication device 410 to maintain the communication session.

To establish the alternate communication link, the hybrid mobile device 124 may initially send an out of band or even an out of network signal to the call server 102. A call between the hybrid mobile device 124 and a called communication device 410 by way of call server 102 may be initially setup using the session initiation protocol (SIP). IP addresses and ports are exchanged and an audio (and/or video) codec is negotiated for the exchange of media. Audio (and/or video) from both ends flows using RTP and the selected codec(s). Any further change in the call is accomplished using SIP (e.g., one party hangs up). The hybrid mobile device 124 may also maintain an open data channel with the call server 102 using, for example, a protocol called Message Queue Telemetry Transport (MQTT). MQTT is an open message protocol for machine-to-machine communication that enables the transfer of telemetry-style data in the form of messages from pervasive devices, along high latency or constrained networks, to a server or small message broker. Pervasive devices may range from., for example, sensors and actuators, to mobile phones, embedded systems on vehicles, or laptops and full-scale computers.

The MQTT channel is riot involved in the initial call setup. As long as the communication device has some sort of network connection, the MQTT channel is available. The impending handoff signal may be sent from We communication device to the server using this data channel. The MQTT channel is out of band in the sense that it is not involved with the initiation or destruction of a communication session (e.g., phone call). Nor is it in the path of the exchange of media between the hybrid mobile device 124 and the call server 102. Additionally or alternatively, the impending handoff signal could be out of band in the sense that it uses an alternative such as, for example, a text message, white space, or LTE that may be referred to herein as out of network signals.

The out of band or out of network signal may instruct the call server 102 to initiate the process of establishing an alternate communication link between the hybrid mobile device 124 and the call server 102. The out of band or out of network signal may be the result of the hybrid mobile device 124 detecting poor or degrading original network connectivity or may be based on one or more other sensor inputs indicative of the impending need for a handoff. Once the out of band or out of network signal requesting establishment of an alternate communication link is received, the call server 102 may initiate the alternate communication link by first determining on what network the original communication link is established. The call server 102 may then dial the hybrid mobile device 124 using the telephone number associated with the alternate network connection 520 to the hybrid mobile device 124. The hybrid mobile device 124 may then automatically answer the call without user notification or intervention. The call server 102 may then join the alternate communication link with communication link to the other communication device 410 to maintain the communication session before severing the original communication link between hybrid mobile device 124 and the call server 102. Alternatively, the hybrid mobile device 124 may sever the original communication link once the alternate communication link is established.

For example, if the original network connection 510 for the original communication link is a VoIP based WiFi connection, the alternate communication link may be established over a mobile carrier network via a cellular system. The hybrid mobile device 124 will have both a data telephone number associated with, in this example, the original network 510 and a mobile telephone number associated with the alternate network 520. The alternate communication link may be routed over the alternate network 520 by having the call server 102 send call establishment signaling to the hybrid mobile device 124. Since the hybrid mobile device 124 is currently connected to the call server on the original communication link, the incoming new call signaling may be acted upon without notifying the user. For instance, the hybrid mobile device 124 may not ring, vibrate, or display a call waiting message pertaining to the incoming call from the call server 102. Rather, the hybrid mobile device 124 may automatically answer the new incoming call over the alternate network 520 based on a particular piece of information in the signaling data that identifies the new call as being a handoff for the current call. For example, the out of band or out of network signal sent by the hybrid mobile device 124 to the call server 102 may include a flag or data bits uniquely signifying a request to create an alternate communication link between the hybrid mobile device 124 and the call server 102 and switch from the original communication link to the alternate communication link. In another embodiment, the call server may use a particular telephone number as the source number when signaling the hybrid mobile device 124. The particular number may be dedicated to handoff calls only.

The technique(s) described may work whether the original network 510 is an IP based VoIP network 122/101 and the alternate network 520 is a cellular based mobile carrier network 110 or vice versa. In addition, there may be other types of non-cellular based network(s) that can function as the original network 510 or alternate network 520. The embodiments are not limited to these examples.

Included herein is a set of flow charts and message diagrams representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
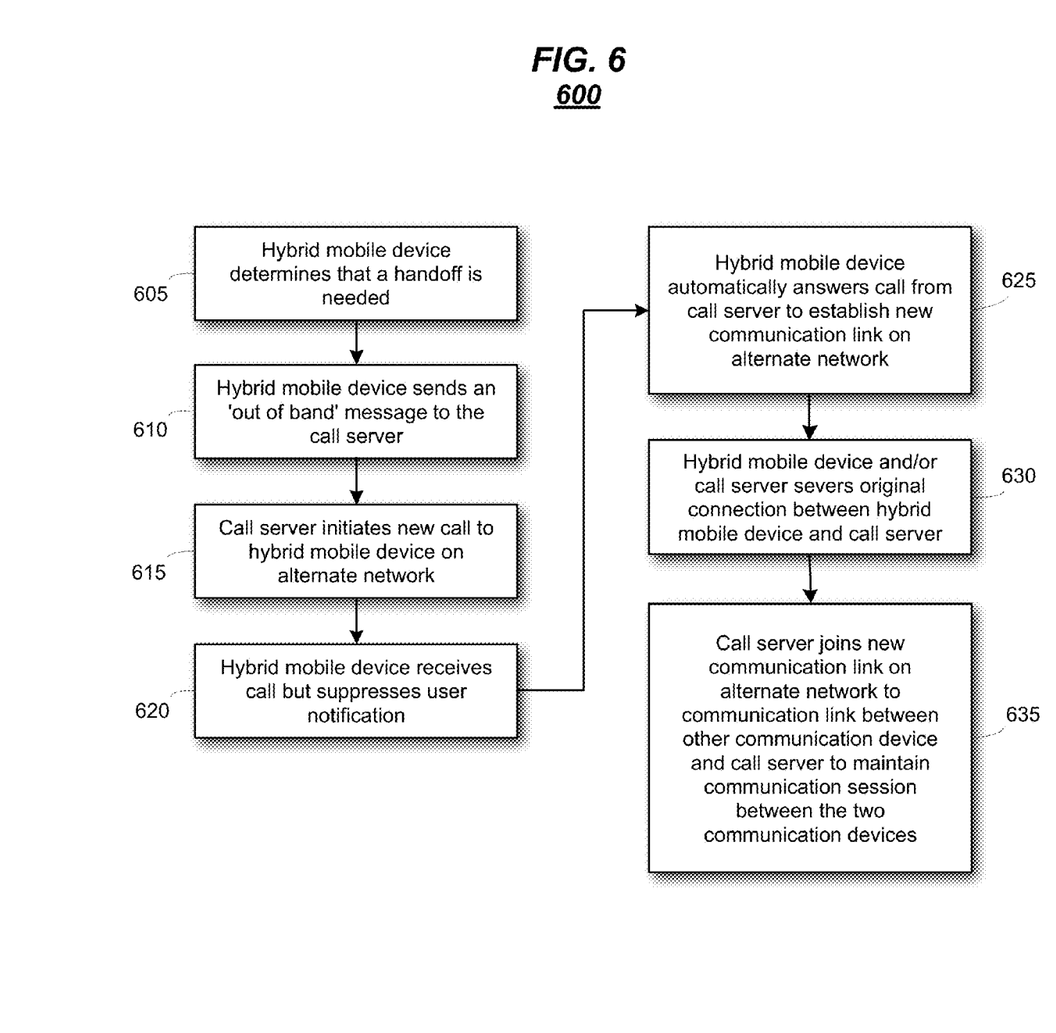
FIG. 6 is an illustration of a logic flow diagram for executing a handoff of a portion of a communication session between different networks.

FIG. 6 illustrates one embodiment of a logic flow 600 for executing a handoff of a portion of a communication session between different networks. The logic flow 600 may be representative of some or all of the operations executed by one or more embodiments described herein. In this embodiment, steps are disclosed that allow a hybrid mobile device 124 to signal a call server 102 that a handoff from an original communication link to an alternate communication link is needed.

In the illustrated embodiment shown in FIG. 6, the logic flow 600 may determine that a handoff is needed between the hybrid mobile device 124 and the call server 102 at block 605. For example, it is presumed that a communication session as described earlier has been established. The hybrid mobile device 124 may detect that the current network connection for the hybrid mobile device 124 is degrading and in danger of complete loss or an unacceptable level of quality. One indicator may include a weakening signal strength between the hybrid mobile device 124 and a network access point to which the mobile hybrid device 124 is connected. The network access point could be IP based 120 in the case of a VoIP WiFi connection or a basestation 112 in the case of a cellular connection to a mobile carrier network 110.

The logic flow 600 may send an out of band or out of network signal from the hybrid mobile device 124 to the call server 102 at block 610. For example, the hybrid mobile device 124 upon determining a handoff between networks may be needed may create an out of band signal to be sent to the call server 102. The out of band signal may comprise a signal sent over an MQTT data channel and may also include data indicating a handoff from the current network connection to an alternate network connection is needed. In another embodiment, the out of band signal may be replaced with an out of network signal. An out of network signal may comprise a signal that is sent over a network that is not the network currently being used by the hybrid mobile device 124 for the communication session. The out of network signal may be out of network in the sense that it uses an alternate network type such as, for example, a text message network, a white space network, or an LTE network.

The logic flow 600 may initiate a new call to the hybrid mobile device 124 at block 615. For example, the call server 102 may signal the hybrid mobile device 124 over the alternate network 520 to establish a new communication link. If the alternate network 520 is a mobile carrier network 110, for example, the call server 102 may place a call to a telephone number associated with both the hybrid mobile device 124 and the mobile carrier network 110. If the alternate network 520 is a IP data network 122/101 using VoIP telephony protocols, for example, the call server 102 may place a call to a telephone number associated with both the hybrid mobile device 124 and the IP data network 122/101 using VoIP telephony protocols.

The logic flow 600 may receive a new call but suppress user notification at block 620. For example, the hybrid mobile device 124 may receive the new call made to it by the call server 102 at step 615. Upon receipt of the new call, the hybrid mobile device 124 may recognize the source of the call as being the call server 102 and also determine that the incoming new call is occurring shortly after the hybrid mobile device 124 sent the out of band or out of network signal indicating that a handoff may be needed. Knowing that information, the hybrid mobile device 124 may suppress the typical incoming call user notifications such as ringing, vibrating, etc. and automatically answer the call at block 625.

The logic flow 600 may sever the original network 510 connection at block 630. For example, the hybrid mobile device 124 and/or the call server 102 may sever the original communication link between the hybrid mobile device 124 and the call server 102 on the original network 510 upon establishing the new communication link on the alternate network 520. The call server 102 may then join the new communication link on the alternate network with the communication link between the other communication device 410 and the call server 102 to maintain the communication session between the hybrid mobile device 124 and the other communication device 410 at block 635.

Figure 7A:
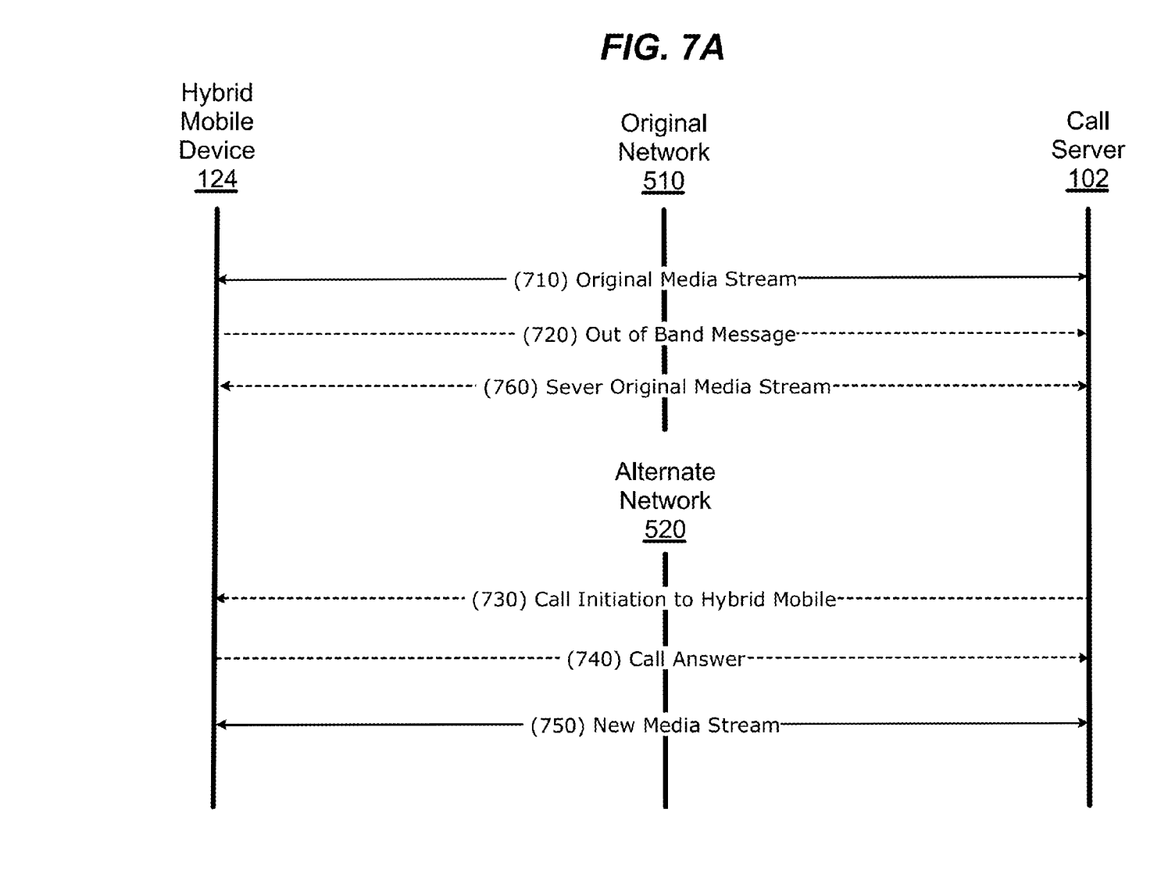
FIG. 7A is one embodiment of a messaging diagram for executing a handoff of a portion of a communication session between different networks.

FIG. 7A is one embodiment of a messaging diagram for executing a handoff of a portion of a communication session between different networks. In this embodiment, a messaging diagram is described using an out of band message to initiate a handoff off a communication link from an original network 510 to an alternate network 520. An original media stream 710 is shown and pre-supposes that a communication session between a hybrid mobile device 124 and a second communication device 410 that is intermediated by a call server 102 exists. As described above, the hybrid mobile device 124 may have determined that a handoff from the original network 510 carrying the communication link to an alternate network 520 is needed based on, for example, degrading network conditions or a weakening signal strength on the original network 510. In such a scenario, the hybrid mobile device 124 may create and send an out of band message 720 to the call server 102 indicating the need for a new communication link on an alternate network 520. The out of band message 720 may comprise, for instance, a signal sent over an MQTT data channel.

The call server 102 may receive the out of band message 720 and respond with a call initiation 730 to the hybrid mobile device 124 over the alternate network 520. The hybrid mobile device 124 may execute a call answer 740 process to establish a new communication link with the call server 102 on the alternate network 520. A new media stream 750 may then be established between the hybrid mobile device 124 and the call server 102 over the alternate network 520. The call server 102 may then sever the original media stream 760 between the hybrid mobile device 124 and the call server 102 on the original network 510. The call server 102 may then join the new communication link to the communication session replacing the original communication link such that communication session between the hybrid mobile device 124 and the other communication device 410 is maintained.

Figure 7B:
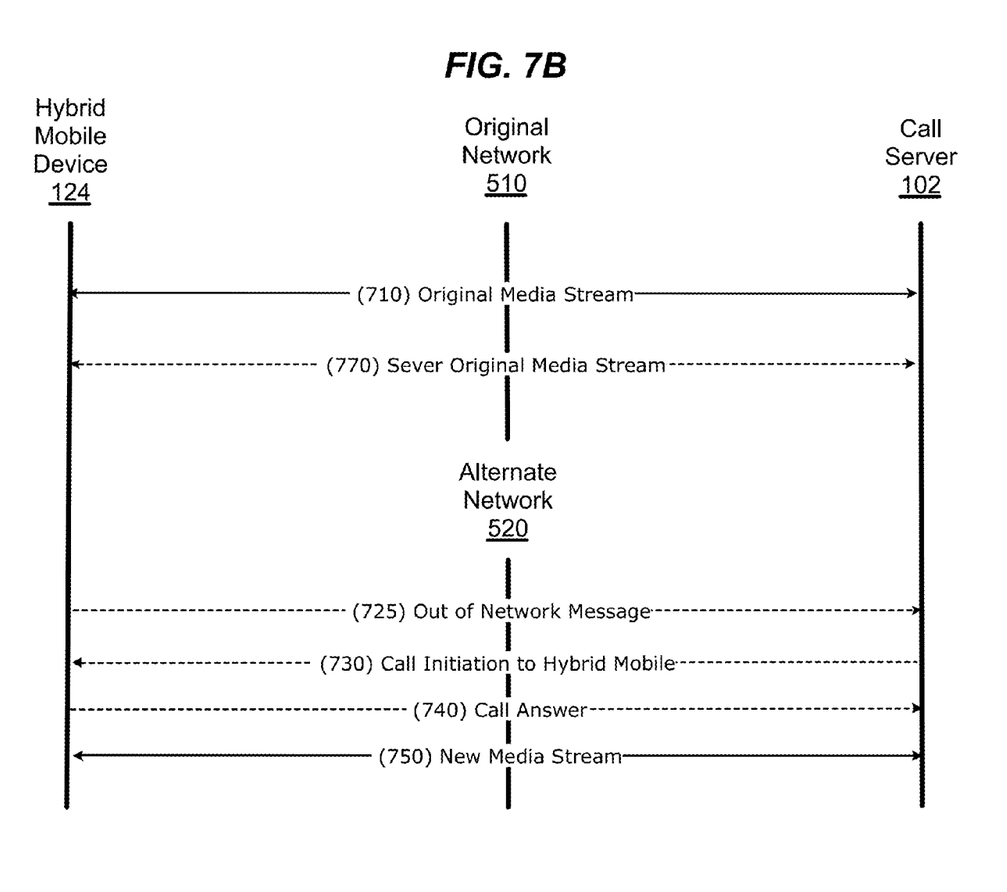
FIG. 7B is another embodiment of a messaging diagram for executing a handoff of a portion of a communication session between different networks.

FIG. 7B is another embodiment of a messaging diagram for executing a handoff of a portion of a communication session between different networks. In this embodiment, a messaging diagram is described using an out of network message to initiate a handoff off a communication link from an original network 510 to an alternate network 520. An original media stream 710 is shown and pre-supposes that a communication session between a hybrid mobile device 124 and a second communication device 410 that is intermediated by a call server 102 exists. As described above, the hybrid mobile device 124 may have determined that a handoff from the original network 510 carrying the communication link to an alternate network 520 is needed based on, for example, degrading network conditions or a weakening signal strength on the original network 510. In such a scenario, the hybrid mobile device 124 may create and send an out of network message 725 to the call server 102 indicating the need for a new communication link on an alternate network 520. The out of network message 725 may comprise, for example, a signal sent over an alternate network 520 such as, for instance, a text message network, a white space network, or an LTE network.

The call server 102 may receive the out of network message 725 and respond with a call initiation 730 to the hybrid mobile device 124 over the alternate network 520. The hybrid mobile device 124 may execute a call answer 740 process to establish a new communication link with the call server 102 on the alternate network 520. A new media stream 750 may then be established between the hybrid mobile device 124 and the call server 102 over the alternate network 520. The call server 102 may then sever the original media stream 760 between the hybrid mobile device 124 and the call server 102 on the original network 510. The call server 102 may then join the new communication link to the communication session replacing the original communication link such that communication session between the hybrid mobile device 124 and the other communication device 410 is maintained.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Although the flowcharts and message diagrams of FIGS. 6-7B each show a specific order of execution, it is understood that the order of execution may differ from that which is depicted. Also, steps shown in succession in the flowcharts may be executed concurrently or with partial concurrence. Further, in some embodiments, one or more of the steps shown in the flowcharts may be skipped or omitted. In addition, any number of counters, state variables, warning semaphores, or messages might be added to the logical flows described herein, for purposes of enhanced utility, accounting, performance measurement, or providing troubleshooting aids, etc. It is understood that all such variations are within the scope of the present disclosure.

Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

A memory is defined herein as including both volatile and nonvolatile memory and data storage components. Volatile components are those that do not retain data values upon loss of power. Nonvolatile components are those that retain data upon a loss of power. Thus, a memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may comprise additional systems designed to coordinate this communication, including, for example, performing load balancing. A processor may be of electrical or of some other available construction.

Although the bridge/routing module 102a, intelligence module 102b, and handoff module 102c and other various systems and components described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic, functionality or application described herein, including the bridge/routing module 102a, intelligence module 102b, and handoff module 102c, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
hosting a communication session in a call server between a first communication device and a second communication device, the call server operable in an Internet Protocol (IP) based packet data network in which:
(i) the call server functions as a bridge between the first communication device and the second communication device joining an original communication link between the first communication device and the call server with a second communication link between the second communication device and the call server to create a communication session between the first and second communication devices, and
(ii) the first communication device includes at least two RF transceivers each capable of communicating with the call server over a separate network, wherein the original communication link between the first communication device and the call server is initially established over an original network and the IP based packet data network using a first telephone number associated with the first communication device;
receiving an out of band signal from the first communication device, the out of band signal separate from the communication session and sent over an open data channel between the first communication device and the call server, the out of band signal comprising an instruction to handoff the original communication link to an alternate communication link between the first communication device and the call server;
establishing the alternate communication link between the first communication device and the call server on an alternate network and the IP based packet data network using a second telephone number associated with the first communication device; and
joining the alternate communication link between the first communication device and the call server on the alternate network with the second communication link between the second communication device and the call server to maintain the communication session between the first and second communication devices.

2. The method of claim 1, wherein the original network is one of a voice over IP (VoIP) data network, a mobile carrier network, a WiMax network, and a whitespace network.

3. The method of claim 1, wherein the alternate network is one of a VoIP IP data network, a mobile carrier network, a WiMax network, and a whitespace network.

4. The method of claim 1, further comprising disabling the original communication link between the first communication device and the call server.

5. The method of claim 1, wherein the open data channel between the first communication device and the call server is a Message Queue Telemetry Transport (MQTT) data channel.

6. A call server operable in an Internet Protocol (IP) based packet data network, the call server comprising:
a processor operable to execute one or more software modules, the software modules including instructions that when executed:
host a communication session between a first communication device and a second communication device wherein:
(i) the call server functions as a bridge between the first communication device and the second communication device joining an original communication link between the first communication device and the call server with a second communication link between the second communication device and the call server to create a communication session between the first and second communication devices, and
(ii) the first communication device includes at least two RF transceivers each capable of communicating with the call server over a separate network, wherein the original communication link between the first communication device and the call server is initially established over an original network and the IP based packet data network using a first telephone number associated with the first communication device;
receive an out of band signal from the first communication device, the out of band signal separate from the communication session and sent over an open data channel between the first communication device and the call server, the out of band signal comprising an instruction to handoff the original communication link to an alternate communication link between the first communication device and the call server;
establish the alternate communication link between the first communication device and the call server on an alternate network and the IP based packet data network using a second telephone number associated with the first communication device; and
join the alternate communication link between the first communication device and the call server on the alternate network with the second communication link between the second communication device and the call server to maintain the communication session between the first and second communication devices.

7. The call server of claim 6, wherein the original network is one of a voice over IP (VoIP) data network, a mobile carrier network, a WiMax network, and a whitespace network.

8. The call server of claim 6, wherein the alternate network is one of a voice over IP (VoIP) data network, a mobile carrier network, a WiMax network, and a whitespace network.

9. The call server of claim 6, further comprising disabling the original communication link between the first communication device and the call server.

10. The call server of claim 6, wherein the open data channel between the first communication device and the call server is a Message Queue Telemetry Transport (MQTT) data channel.

11. A method comprising:
establishing an original communication link between a first communication device and a call server operable in an Internet Protocol (IP) based packet data network, the original communication link established over an original network and the IP based packet data network using a first telephone number associated with the first communication device;

joining the original communication link between the first communication device and the call server on the original network with a second communication link between a second communication device and the call server to establish a communication session between the first and second communication devices;

receiving an out of band signal from the first communication device, the out of band signal separate from the communication session and sent over an open data channel between the first communication device and the call server, the out of band signal comprising an instruction to handoff the original communication link to an alternate communication link between the first communication device and the call server;

establishing the alternate communication link between the first communication device and the call server on an alternate network and the IP based packet data network using a second telephone number associated with the first communication device; and joining the alternate communication link between the first communication device and the call server on the alternate network with the second communication link between the second communication device and the call server to maintain the communication session between the first and second communication devices.

12. The method of claim 11, wherein the original network is one of a voice over IP (VoIP) data network, a mobile carrier network, a WiMax network, and a whitespace network.

13. The method of claim 11, wherein the alternate network is one of a VoIP IP data network, a mobile carrier network, a WiMax network, and a whitespace network.

14. The method of claim 11, further comprising disabling the original communication link between the first communication device and the call server.

15. The method of claim 11, wherein the open data channel between the first communication device and the call server is a Message Queue Telemetry Transport (MQTT) data channel.

* * * * *